UNITED STATES PATENT OFFICE

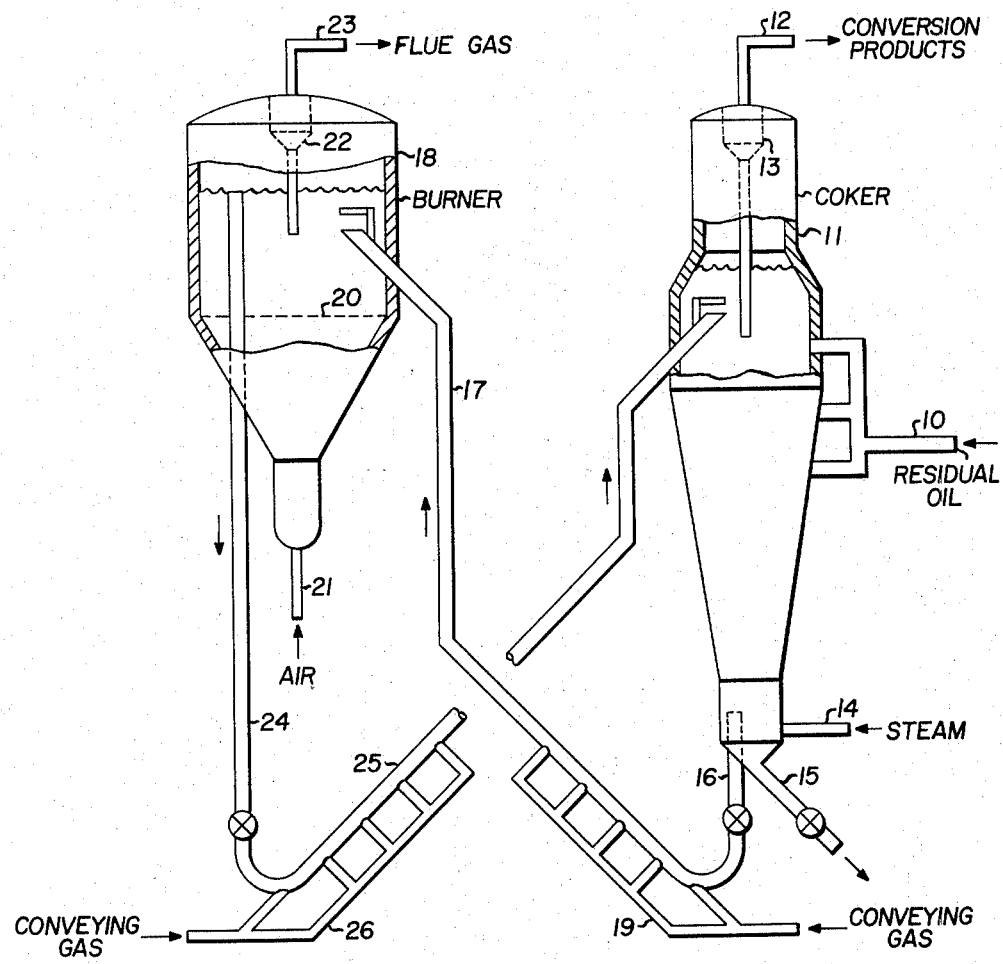
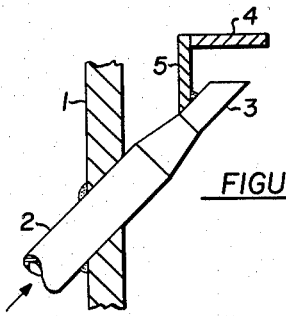

2,902,433
TRANSFER LINE DISCHARGE NOZZLE

Peter H. Spitz, New York, N.Y., and Daniel S. Borey, Chatham, N.J., assignors to Esso Research and Engineering Company, a corporation of Delaware Application July 13, 1955, Serial No. 521,759

3 Claims. (Cl. 208—127)

The present invention relates to the transporting of fluidized solids. It is more particularly concerned with the introduction of contact solids into a dense turbulent reaction bed in a fluidized solids conversion process. It has particular applicability to the introduction of relatively coarse heat-carrying coke particles into a hydrocarbon oil fluid coking bed.

In a two-vessel fluidized solids system involving the contacting of liquid or gaseous fluid mediums with solids maintained as fluid beds, it is necessary to transport the contact solid between reaction vessels and to introduce the solids into each vessel. The contact solid may function as a reactant, catalyst and/or heat carrier. It is the general practice in such systems to circulate the solids between vessels by a standpipe and riser system wherein the solids are removed from one vessel via a standpipe as a relatively high density column and are then transferred to the other vessel via a riser as a relatively dilute gas-solids suspension. The high density column of solids in the standpipe serves to generate a fluidstatic pressure sufficient to circulate the solids between vessels. Packie Patent U.S. 2,589,124 illustrates one type of standpipe and riser system used in such two-vessel fluidized solids processes.

In many cases, it is desirable to introduce the solids directly into the fluid reaction bed and to avoid the use of loops and unnecessary lengths of pipe. It may also be desirable to have the solids inlet line enter the reaction vessel from the side rather than through the bottom. With such limitations, it is necessary for the solids conveying conduit or riser to enter the vessel at an upward angle and terminate within the fluid bed. It has been found with such an arrangement, that the solids of the fluid bed tend to backflow into the riser and thereby to cause slugging and surging of the solids circulation system.

This problem of introducing contact solids into a fluid reaction bed is of particular importance in the process of fluid coking wherein the solids used, e.g., coke particles produced in the process, are relatively coarse, smooth and free flowing. This type of solid has a tendency to deaerate readily and to slide back into the riser.

This invention provides an effective answer for these and other problems associated with the introduction of particulate contact solids into dense turbulent fluidized reaction beds.

This invention will become clear from the following discussion of the drawings attached to and forming a part of this specification.

Figure I of the drawings illustrates a transfer line discharge nozzle for introducing contact solids directly into a fluid reaction bed at an upward angle, while preventing backflow of the solids into the inlet conduit.

Figure II illustrates this invention as applied to the process of fluid coking and the drawing illustrates more particularly two points of application of this invention within the coking process.

Briefly the invention is concerned with a transfer line discharge nozzle for introducing a relatively dilute gas-solids suspension into a dense turbulent bed of fluidized solids which comprises, in combination, an inclined conduit converging to a nozzle of reduced area, the nozzle terminating and upwardly opening substantially in a horizontal plane, a horizontal baffle above and in vertical spaced relation to the end of the nozzle, and a vertical baffle connecting to the rear edge of the horizontal baffle and extending and connecting to the inclined conduit.

Referring now to Figure I, there is shown a transfer line discharge nozzle projecting through a reaction vessel wall 1. Although not shown, the nozzle discharges into a fluid bed of solids maintained to the right of wall 1. The nozzle comprises an initial conduit 2 of enlarged diameter. Solids are conveyed by conduit 2 from a standpipe or other source of supply at a relatively low velocity so as to avoid erosion and an undue pressure drop. The whole of the nozzle, including the initial conduit 2 illustrated, is inclined at an angle to enter through the wall 1 and to provide for smooth flow of the solids. For best performance, it is preferred to maintain this angle of inclination within the range of 10° to 60° from the vertical. At greater inclinations, the solids tend to settle out in conveying conduit 2 and cause flow stoppages. At lesser angles, entering the vessel becomes difficult.

Within the vessel, conveying conduit 2 converges to an outlet nozzle 3. This serves to increase the velocity of the gas solids suspension and to offset backflow of the solids. Preferably the area of the cross-sectional area nozzle 3 is 40 to 60% of the cross-sectional area of the conduit 2. Thus the velocity of the solids in conduit 2 which is usually in the range of about 5 to 20 ft./sec. is increased to 10 to 40 ft./sec. Because this reduction of area takes place within the vessel, the problems associated with erosion of the nozzle because of the increase in velocity are somewhat circumvented. If the nozzle or swage is damaged because of erosion, there will be no loss of the conveyed solids from the system.

Nozzle 3 terminates in a horizontal plane. This is important. With a vertical nozzle opening or an inclined one wherein there is likely to be an appreciable differential pressure over the height of the nozzle, there is a marked tendency for the gas used to convey the solids to flow out of only the upper part of the nozzle. This facilitates flow of solids from the bed down through the lower side of the nozzle to riser 2.

Associated with the nozzle is a horizontal baffle 4 vertically spaced from the nozzle opening. For the velocities customarily employed, the baffle is preferably spaced 1 to 2 nozzle diameters above the nozzle. It is designed to cover an area at least equal to the area of the vertical projection of the nozzle opening. This horizontal baffle prevents pressure surges and agitation of the fluid bed from driving contact solids into the nozzle. The horizontal baffle may be extended somewhat and used to dissipate the upward or vertical component of motion of the solids by impingement. When discharging the solids near the surface of the fluid bed, this baffle also serves to decrease entrainment.

A vertical plate or baffle 5 is placed to the rear side of the nozzle between the nozzle and the vessel wall, and serves to support baffle 4. It has been found that the conveying gas emerging from the nozzle has a tendency to pass directly to the vessel wall and rise through the fluid bed near the wall at a relatively high velocity. This causes extreme erosion of the vessel wall. Baffle 5 prevents this short circuiting of the conveying gas through the fluid bed. Although baffle 5 is shown as being affixed to the rear edge of baffle 4 and extending to and connecting with nozzle 3 thus supporting baffle 4, both baffles may be additionally or entirely supported by connections from wall 1 if desired.

Although conduit or riser 2 is shown as being permanently mounted in vessel wall 1, the discharge nozzle may be detachably mounted by means of flanged joints, for example, for convenience.

Figure II illustrates applications of this invention to the fluidized solids process of coking heavy hydrocarbon oils such as residual oils, tars, shale oils, and the like. Contact solids used in this coking process may be spent catalyst, sand, ceramic beads, or metal particles, but it is preferred to use the fluid coke produced by the process. This fluid coke is relatively smooth and coarse. The particle size of fluid coke may range from about 20 to 1000 microns and the true particle density may vary from about 80 to 120 lbs./cu. ft.

A residual oil to be converted is injected via line 10 at a multiplicity of points into reaction vessel or coker 11. Within the vessel, the oil contacts fluidized coke particles maintained at a coking temperature of about 900° to 1200° F. and cracks evolving lighter hydrocarbon vapors and depositing coke on the fluidized coke particles. The vapors are removed overhead by line 12 as product after having entrained solids removed by cyclone system 13.

Steam is admitted to the base of the vessel at a plurality of points, one of which is shown as line 14. This steam serves to fluidize the bed and also to strip solids in the lower portion of vessel 11. It is customary to use superficial fluidizing velocities in the range of 0.5 to 5 ft./sec. Excess coke produced by the process and coarse non-fluidizable solids are removed from the vessel via line 15.

A portion of the fluid bed is continuously removed by standpipe 16 and transferred to heating vessel or burner 18 via riser 17. A conveying gas, e.g., steam, is admitted to the base of the standpipe and to the riser via manifold system 19 as is customary to decrease the density of the mixture and to convey the solids. In some cases, the gas used to convey the solids may be a reactant. Thus air can be used to convey the solids to the burner.

A fluidized bed of coke particles supported by perforate grid 20 is maintained in the burner by admitting a free oxygen-containing gas, e.g., air, to the base of the vessel via line 21 in combustion-supporting amounts. This serves to partially burn the coke particles and to raise them to a temperature in the range of 1050° to 1800° F., at least 100° to 400° F. above the coking temperature. Flue gases are removed overhead and have entrained solids removed in cyclone 22 before being vented via line 23. Heated solids are withdrawn from the burner by standpipe 24 and are circulated to the coker by riser 25 with conveying gas, e.g., steam, being admitted to the base of the standpipe and to the riser by manifold system 26.

A small amount of aerating gas may be injected into standpipes 16 and 24 to maintain the solids in free flowing condition. The density of the suspension in the standpipe is maintained sufficiently high, however, to create a fluid static pressure to serve as a driving force and as a seal between the reaction vessels. For the above-described coke particles, densities in the standpipe may range from 30 to 70% of the true particle density and density in risers 17 and 25 near the upper portion thereof may range from 10 to 25% of the true particle density. Solids velocities in the standpipe range from about 2 to 6 ft./sec. and in the riser range from 5 to 20 ft./sec. near the upper end thereof.

The apparatus so far described in conjunction with Figure II is conventional and no attempt is made to claim features of fluid coking other than those necessarily relating to the present invention. Other means of heating the solids may be used in some applications. Gravitating bed type of operations or transfer line burners will, for example, also satisfactorily serve to heat the coke particles.

The discharge nozzle of the present invention is used to introduce coke particles into either burner 18 or coker 11. As applied to the burner, the present discharge nozzle permits side entry of the riser into the burner, as shown, and avoids the necessity of bottoms entry through the cone bottom and up through the perforate grid. Such a manner of introducing solids into the burner through the bottom presents mechanical sealing problems because of the difference in thermal expansion and contraction in the equipment.

In connection with both vessels, side entry as illustrated permits the shortest riser to be used and avoids the necessity of looping lines for downward entry into the vessels.

As indicated previously, it is desirable to introduce the heated coke particles directly into the fluid coking bed. If the heated solids and the conveying gas are introduced into the disperse or dilute phase above the fluid bed, they serve to superheat the conversion products in this zone and to cause undue vapor phase cracking. Entrainment may also be unnecessarily increased if the heated solids are introduced into the disperse phase.

According to this invention, the solids are introduced directly into the fluid bed. Because of the increase in velocity of the solids, and because of the horizontal baffle, backflow of solids into riser 25 is effectively prevented and surging or slugging of the flowing solids is avoided.

*Example*

For the system illustrated in Figure II, 90% of the coke particles may have a particle size in the range of 90 to 300 microns, 150 microns average particle size and a true particle density of 95 lbs./cu. ft. The fluid coking bed may have a fluidized density of 40 lbs./cu. ft. and a temperature of 950° F. 70 tons of coke may be contained in coking vessel 11 with the vessel being rated at about 3800 bbls./day residual oil coking capacity. Pressure in the disperse phase may be 11 p.s.i.g. Heated solids at a temperature of 1125° F. and at a rate of 0.07 lb./minute/lb. of solids in the bed may be introduced 6 ft. below the upper level of the fluid bed. The heated solids may be available at a density of 15 lbs./cu. ft. in conveying conduit 2 at the point of entry into the vessel. Line 2 may be 13 in. in diameter reducing to a nozzle 9 in. of diameter such that the initial velocity of the solids is 10 ft./sec. and the outlet velocity is 20 ft./sec. The transfer line discharge nozzle may be inclined 30° from the vertical. Horizontal baffle 4 formed from a 14 x 18 in. plate, may be located 1.5 nozzle diameters above the point of discharge of the solids. The vertical baffle 5 may be located 1 ft. from the vessel wall and 8 in. from the center line of discharge of nozzle 3 and may extend 7 in. on either side. Conventional materials of construction, such as carbon steel, may be used to fabricate the discharge nozzle.

Although this invention has been described in relation to a fluid coking system, it will be apparent to those skilled in the art that it has wider applicability. It may find use in other fluidized solid conversion processes such as catalytic cracking of gas oils, catalytic reforming of naphthas, distillation of shales, absorption of gases, roasting of ores and gasification of coal.

Having described this invention, what is sought to be protected by Letters Patent is succinctly set forth in the following claims.

What is claimed is:

1. In a hydrocarbon oil fluid coking process, a method of introducing heat-carrying particulate contact solids directly into the dense turbulent reaction bed which comprises upwardly passing a relatively dilute solids-gas suspension of hot contact solids through a passageway inclined 10° to 60° from the vertical and terminating in a horizontal plane, said solid-gas suspension being discharged from said passageway directly into said bed, initially flowing said solids-gas suspension through said passageway at a velocity in the range of 5 to 20 ft./sec. and at a density in the range of 10 to 25% of the true particle density of said contact solids, thereafter increasing the velocity of said suspension to a velocity in the range of 10 to 40 ft./sec., discharging said suspension at the increased velocity from the terminal, horizontal plane of said passageway directly into said reaction bed, the area immediately above said horizontal plane being partially enclosed to prevent backflow of solids into said passageway.

2. Apparatus for introducing a relatively dilute gas-solids suspension into a dense turbulent fluidized bed of solids which comprises, in combination, a vessel adapted to contain a dense turbulent bed of fluidized solids in the intermediate portion thereof, an upwardly inclined conduit extending into an intermediate portion of said vessel, and converging to a nozzle of a reduced cross-sectional area, said nozzle terminating in an opening substantially in a horizontal plane, a horizontal baffle above and in vertical spaced relation to said nozzle and a vertical baffle connecting to the rear edge of said horizontal baffle and extending and connecting to said conduit.

3. Apparatus for contacting solids and fluid media in a fluidized bed which comprises, in combination, a reaction vessel, said fluidized bed of solids being maintained therein, an inclined conduit upwardly extending through the side wall of said vessel into said fluidized bed, said conduit converging to a nozzle of reduced diameter within said vessel, said nozzle terminating into said fluidized bed substantially in a horizontal plane, a horizontal baffle in said bed and in vertical spaced relation to said nozzle adapted to prevent solids from surging into said nozzle from said bed, and a vertical baffle connecting to the rear edge of said horizontal baffle and extending and connecting with said conduit.

References Cited in the file of this patent

UNITED STATES PATENTS

| | | |
|---|---|---|
| 1,868,632 | Edge | July 26, 1932 |
| 2,652,317 | Rees et al. | Sept. 15, 1953 |
| 2,661,324 | Leffer | Dec. 1, 1953 |

FOREIGN PATENTS

| | | |
|---|---|---|
| 136,151 | Sweden | July 26, 1932 |